July 30, 1946.　　　A. M. CULBRETH　　　2,405,091
COOLING APPARATUS FOR BOTTLED BEVERAGES
Filed June 27, 1945　　　2 Sheets-Sheet 1
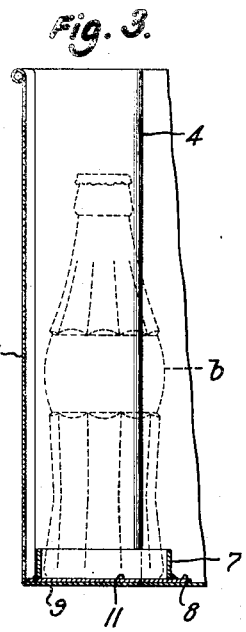
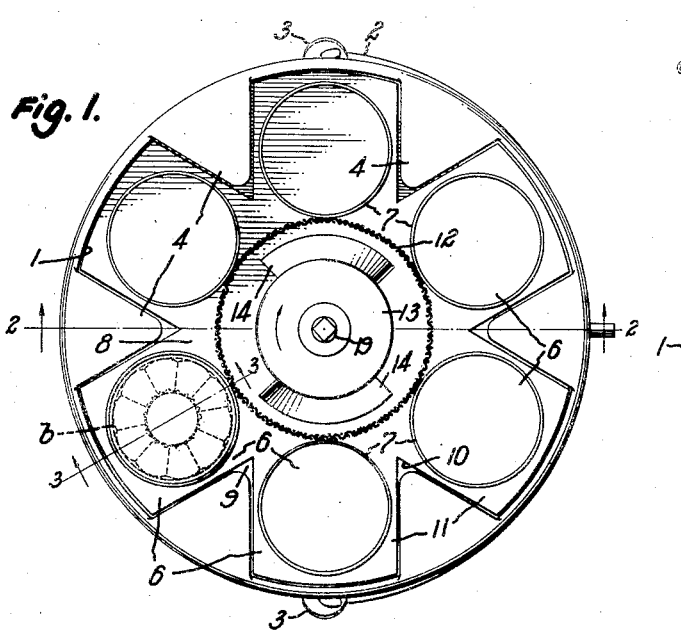
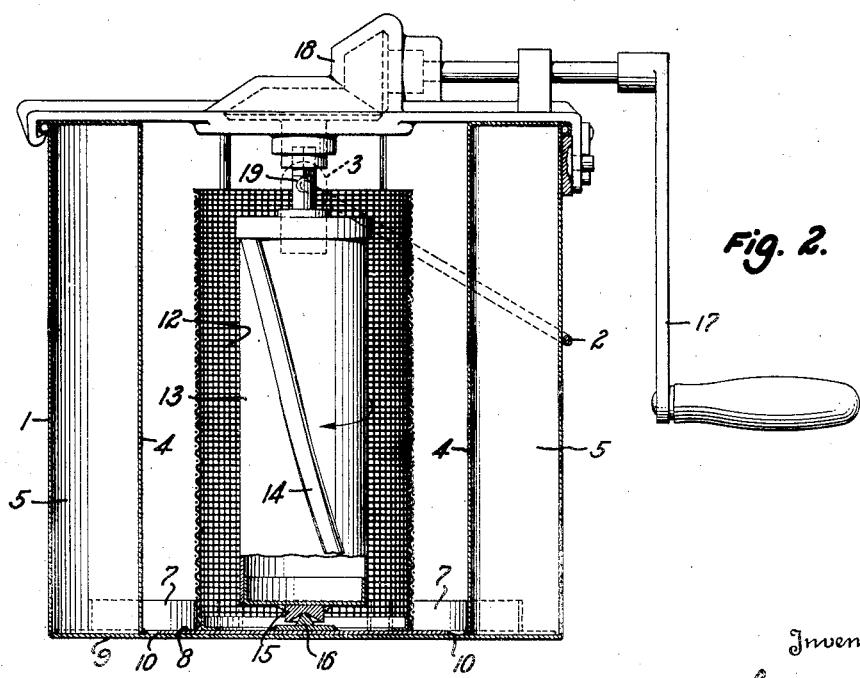
Inventor
Alexander M. Culbreth
By W. T. Fuckel Jr.
Attorney July 30, 1946.  A. M. CULBRETH  2,405,091
COOLING APPARATUS FOR BOTTLED BEVERAGES
Filed June 27, 1945  2 Sheets-Sheet 2

Inventor
Alexander M. Culbreth
By
Attorney

Patented July 30, 1946

2,405,091

UNITED STATES PATENT OFFICE 2,405,091

COOLING APPARATUS FOR BOTTLED BEVERAGES

Alexander M. Culbreth, Valdosta, Ga.

Application June 27, 1945, Serial No. 601,779

7 Claims. (Cl. 62—149)

This invention relates to beverage coolers, and it has special reference to apparatus for cooling bottled beverages, such as soft drinks, beer and the like.

The object of the invention is to provide a device which will cool bottled beverages to a suitable or desired temperature in a short time with a minimum of trouble and with readily available coolants.

The invention comprises a beverage cooler including a receptacle, preferably of cylindrical form, in which a plurality of bottles of a beverage or beverages may be arranged in an annular row adjacent to the inner periphery of its wall in spaced relation and in upright position, the receptacle being designed to receive a coolant, such as the common mixture of water, salt and ice, and being provided with means for agitating and circulating the coolant, including specially designed baffle means for insuring that the coolant circulates around each individual bottle of the series and providing means for dissipating heat with great efficiency, all as will be explained hereafter more fully and finally claimed.

Figure 4:
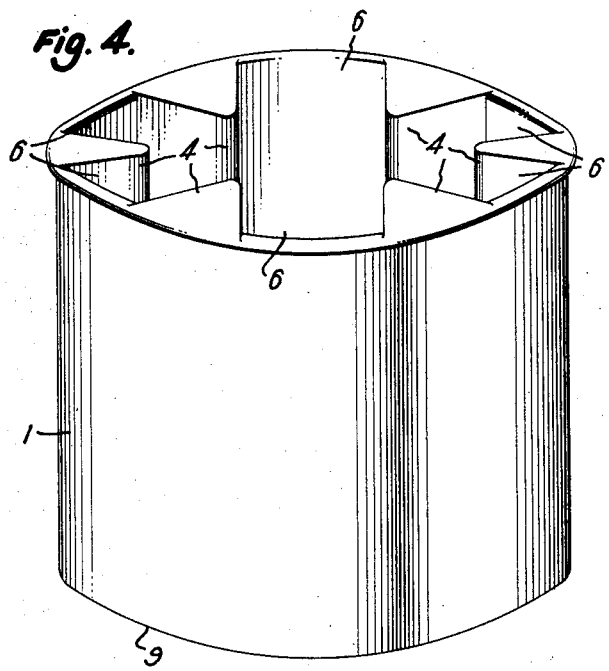
Figure 5:
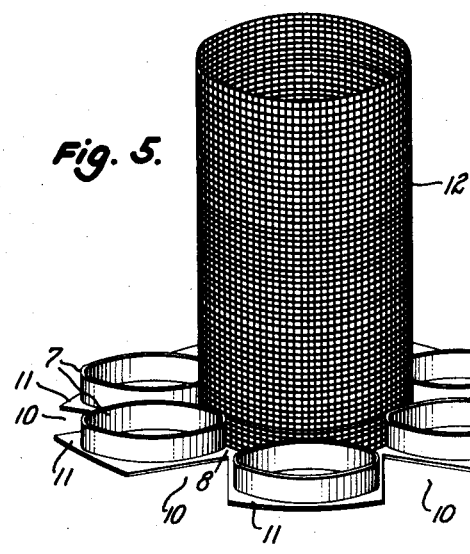

In the accompanying drawings illustrating the invention, in the several figures of which like parts are similarly designated, Fig. 1 is a plan view of the apparatus of the invention with the agitator driving means omitted, Fig. 2 is a sectional elevation taken on the line 2—2 of Fig. 1, and showing one form of agitator driving means in operative assembly, Fig. 3 is a fragmentary section taken on the line 3—3 of Fig. 1, Fig. 4 is a perspective view looking into the top of the receptacle of the apparatus, with the bail and latching means of Figs. 1 and 2 omitted, and Fig. 5 is a perspective view of the unitary agitator protecting guard means and bottle receiving means.

The apparatus of the invention as illustrated in the drawings is designed, particularly as to size and capacity, for the reception and cooling of six bottles of "Coca Cola," but it will be understood that it may be made in sizes to accommodate various numbers and sizes of bottles of beverages, and may be otherwise modified, as will be explained in part hereinafter.

The receptacle 1, which is in the nature of a vertical-walled pail, has a handle or bail 2 pivoted in ears 3, as is customary, for ease in handling and for transporting the apparatus from place to place.

As shown, where the apparatus is designed to receive six bottles of beverages to be cooled, the side wall of the receptacle is provided with six substantially V-shaped fixed baffles 4 having hollow interiors 5 (see Fig. 2). These baffles furnish the interior of the receptacle with six walled spaces or niches 6 in which the bottles of beverage are properly located with respect to adjacent wall surfaces by positioning rings 7 affixed to a base plate 8 which rests upon the bottom 9 of the receptacle and is notched at 10 to provide wings 11 which carry the positioning rings 7 and properly locate these rings within the spaces or niches 6.

Thus the bottles are so positioned in the spaces or niches 6, as shown at b, Figs. 1 and 3, that the coolant will be forced to circulate around and in contact with their entire exposed surfaces and will effect a rapid transfer of heat therefrom.

Also mounted upon the base plate 8 is a cylindrical foraminous guard 12, within which is rotatively mounted an agitator or stirrer 13 having stirrer blades 14 so spirally arranged that when the stirrer is properly rotated, clockwise as indicated, the coolant will be forced downward and will be restrained from a tendency to splash over the top of the receptacle, thus obviating the need for a receptacle cover.

If desired, suitable complemental bearing means 15 and 16 may be provided upon the bottom of the stirrer 13 and upon the base plate 8, respectively, and the stirrer may be rotated by a hand crank and gearing means 17—18, or by a suitable electric motor or other drive connected with the stirrer through the shaft 19.

In operation, the unitary assembly of the base plate 8, rings 7 and guard 12 is placed in position in the receptacle and the bottles of beverages to be cooled are placed in position in the niches 6 by locating their bottoms within the rings 7. Then the space within the receptacle is supplied with a proper amount of coolant, say water, cracked ice or ice cubes and salt, care being taken to keep the ice out of the space within the foraminous guard 12. Thereafter, upon application of the stirrer and its driving means, either manual or power, and its proper rotation, the coolant will be agitated and circulated within the receptacle and will be forced by the baffles 4 to circulate around the various bottles of beverages and cool their contents rapidly and effectively.

The fact that no ice is present within the guard 12 not only makes rotation of the stirrer easy and unobstructed but precludes the possibility of injury to or misalignment of its blades 14.

In actual practice with a beverage cooler made in accordance with the invention and adapted to receive six bottles of "Coca Cola," substantially as shown, it has been found that a mixture of 1½ quarts of water, 1 cup of ice-cream salt and the ice cubes from two ordinary refrigerator trays (or an equivalent quantity of cracked or crushed ice) agitated and circulated by rotation of the stirrer at 450 R. P. M. will cool the contents of the bottles from a temperature of 75° F. to 34° F. in thirteen minutes.

As hereinbefore stated, the apparatus may be so designed as to accommodate bottles of various shapes and sizes, and in various numbers, and the stirrer may be either manually or power driven, suitable gearing or other transmission means being provided to approximate the speed of the stirrer to 450 R. P. M. or to such other speed as may be found most effective in regard to the design and capacity of the apparatus. And various other changes and modifications may be made without departing from the principle of the invention and the scope of the following claims.

What I claim is:

1. A cooler for bottled beverages and the like comprising a receptacle for containing the bottles of beverages and a body of liquid coolant in contact therewith, and means for agitating and circulating the coolant around said bottles, said means including a stirrer rotatable within the body of coolant, and relatively fixed baffle means partially surrounding the bottles of beverages and serving to direct the circulation of the coolant therearound.

2. A cooler for bottled beverages and the like as claimed in claim 1, in which the means for agitating and circulating the coolant include a foraminous guard surrounding the stirrer and protecting the same from solid particles in the coolant.

3. A cooler for bottled beverages and the like as claimed in claim 1, in which the relatively fixed baffle means provide niches for receiving the bottles of beverages, and having means for properly locating said bottles within said niches in spaced relation to the walls of said baffle means.

4. A cooler for bottled beverages and the like, comprising a cylindrical receptacle for containing a liquid coolant and a plurality of bottles of beverages, baffle means fixed in spaced circular series relatively to the inner surface of the side wall of said receptacle and providing between them niches for the bottles of beverages, means positioned within said receptacle by said baffle means and provided with locating means for the bottles of beverages whereby they are held in spaced relation to the walls of said baffle means, and means for agitating the coolant in such manner that it will be circulated within said niches and around said bottles of beverages.

5. A cooler for bottled beverages and the like as claimed in claim 4, in which the means for locating the bottles of beverages within the niches include a base plate resting upon the bottom of the receptacle and members carried by said base plate and serving to position the bottles of beverages.

6. A cooler for bottled beverages and the like as claimed in claim 4, in which the means for agitating and circulating the coolant include a stirrer, and the means for locating the bottles of beverages in the niches include a base plate carrying a foraminous guard enclosing said stirrer.

7. A cooler for bottled beverages and the like as claimed in claim 4, in which a stirrer is provided for circulating the coolant and the means for locating the bottles of beverages include a base plate adapted to rest against the bottom of the receptacle and which carries members for cooperation with the bottles of beverages and foraminous guard means for said stirrer, said base plate and its associated bottle locating and stirrer guard means comprising a unitary structure separable from said receptacle.

ALEXANDER M. CULBRETH.